Jan. 10, 1939. P. F. CAMPBELL 2,143,432
COFFEE BREWER
Filed Sept. 14, 1937 2 Sheets-Sheet 1

Inventor
P. F. Campbell
By Clarence A. O'Brien
Hyman Berman
Attorneys

Jan. 10, 1939. P. F. CAMPBELL 2,143,432
COFFEE BREWER
Filed Sept. 14, 1937 2 Sheets-Sheet 2

Inventor
P. F. Campbell
By Clarence A. O'Brien
Hyman Berman
Attorneys

Patented Jan. 10, 1939

2,143,432

UNITED STATES PATENT OFFICE 2,143,432

COFFEE BREWER

Paul F. Campbell, Saginaw, Mich., assignor of one-half to Marcus A. Campbell, Saginaw, Mich.

Application September 14, 1937, Serial No. 163,868

1 Claim. (Cl. 53—3)

This invention relates to new and useful improvements in domestic utensils and more particularly to a coffee brewer.

The principal object of the invention is to provide a utensil of the character stated in which coffee can be brewed in a much more satisfactory manner than through the use of utensils of this character now on the market.

During the course of the following specification other important objects and advantages of the invention will become apparent to the reader.

In the drawings:—

Figure 1:
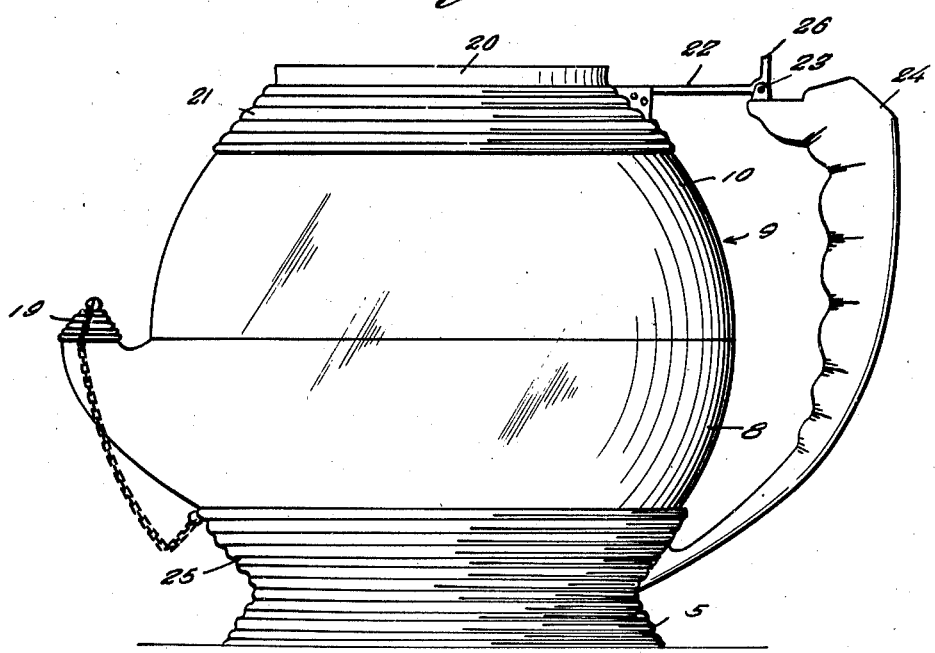
Figure 1 is a side elevational view.
Figure 4:
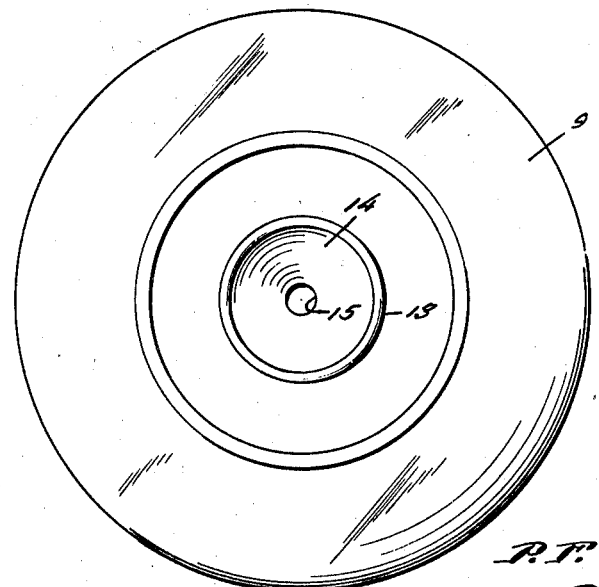
Figure 4 is a top plan view of the bowl structure.
Figure 5:
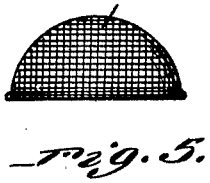
Figure 5 is a side elevational view of the strainer.
Figure 2:
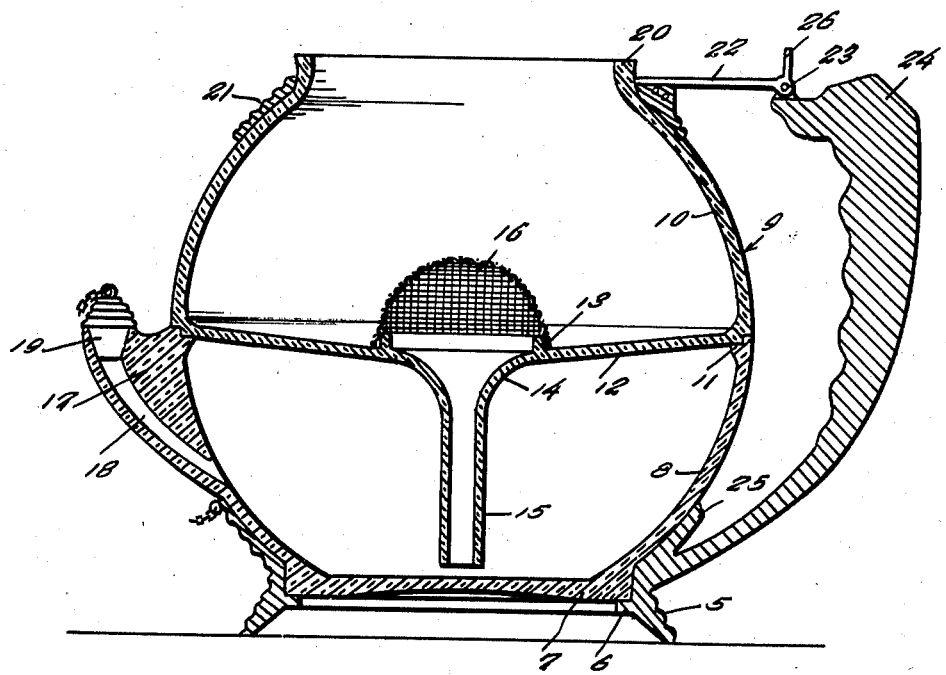
Figure 2 is a vertical sectional view.
Figure 3:
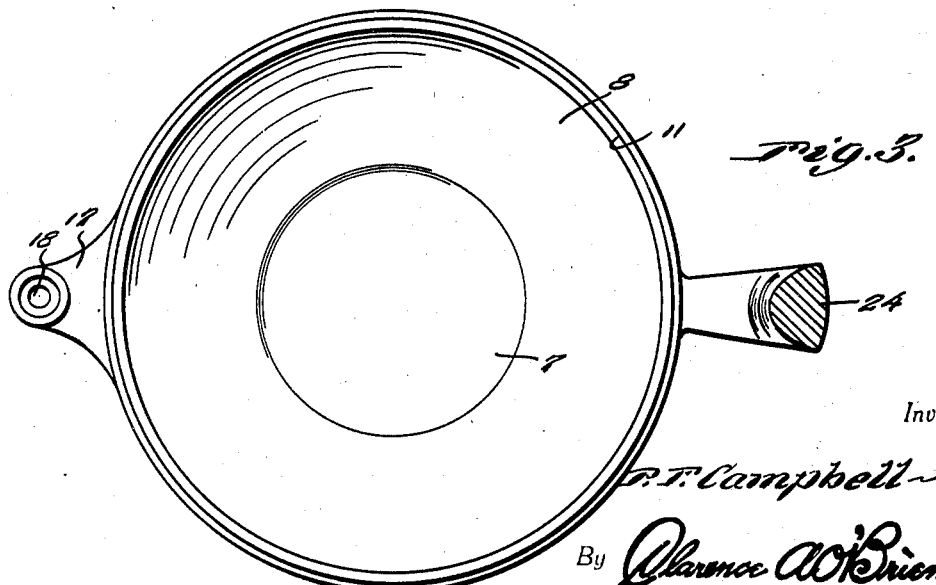
Figure 3 is a horizontal sectional view.

Referring to the drawings wherein like numerals designate like parts, it can be seen that the structure involves an annular base 5 having the internal circumferentially extending shoulder 6 upon which the bottom 7 of the section 8 of the bowl generally referred to by numeral 9 rests. This bowl 9 also includes the upper section 10 and when these sections are together a substantially globular-shaped bowl results.

The upper edge of the section 8 is formed with the shoulder 11 upon which the base portion 12 of the section 10 can rest. The bottom 12 is provided with the upstanding annular formation 13 surrounding the upper flared end portion 14 of the spout 15 which depends into the section 8. A hemispherical-shaped strainer 16 is disposed over the upper portion 14 of the spout 15 and also encompasses the rib structure 13.

A formation 17 extends laterally of the section 8 and has the duct 18 extending therethrough, thus defining a spout. A wedge-shaped stopper 19 can be provided for the outer end of the spout.

The upper portion of the section 10 has an upwardly disposed neck portion 20 which when the utensil is in use is surrounded by the annular collar 21. An arm 22 extends from this collar and is rigidly secured as at 23 to the upper end of the handle 24, this handle 24 extending upwardly from the upwardly flaring side walls 25 above the base 5. A finger tab 26 on the outer end of the arm 22 permits the arm to be rocked with the collar 21 so that the collar is removed from the upper section 10 permitting its removal from the section 8.

While the foregoing specification sets forth the invention in specific terms, it is to be understood that numerous changes in the shape, size, and materials may be resorted to without departing from the spirit and scope of the invention as claimed hereinafter.

Having described the invention what is claimed as new is:—

A utensil of the character described comprising a bowl-shaped structure divided horizontally into an upper lower separable section, a rigid handle extending laterally and upwardly from the lower section to terminate adjacent the top of the upper section, the upper section being provided with a reduced upper portion defining a shoulder, an endless member circumscribing the upper section and adapted to rest upon the shoulder, an arm extending laterally from the member and being pivotally connected to the upper end of the handle, and an upstanding finger tab on the pivotal end of the said arm.

PAUL F. CAMPBELL.